United States Patent Office 3,192,229
Patented June 29, 1965

3,192,229
PHENYLCYCLOPROPYL AMIDES
John H. Biel, Milwaukee, Wis., assignor to Colgate-Palmolive Company, a corporation of Delaware
No Drawing. Filed July 3, 1962, Ser. No. 207,424
4 Claims. (Cl. 260—326.3)

This invention relates to novel chemical compounds and processes of preparing the same. More particularly, this invention is concerned with amides of phenylcyclopropane.

This application is a continuation-in-part of my copending application Serial No. 105,538 filed April 26, 1961, now abandoned, and my now abandoned application Serial No. 11,142 filed February 26, 1960, but which was copending with said Serial No. 105,538.

According to the present invention there are provided novel phenylcyclopropyl amides of the formula

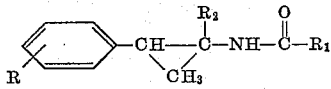

wherein R can be one or more nuclear substituents such as hydrogen, a lower alkyl such as methyl, ethyl, propyl, butyl and isopropyl, a lower alkoxy such as methoxy, ethoxy and propoxy, polyalkoxy groups such as 2,4-dimethoxy and 2,4,6-trimethoxy, a lower alkylenedioxy such as 3,4-methylenedioxy and 3,4-ethylenedioxy, aryloxy groups such as phenoxy, amino, a carboxy-lower alkyl such as carbethoxy, nitro and trifluoromethyl, $R_2$ is hydrogen or a lower alkyl (preferably of 1–5 carbons) such as methyl or ethyl, and $R_1$ is hydrogen or a substittuent of the group consisting of:

(a) Alkyl groups from 1 to 15 carbons and advisably lower alkyl groups such as methyl, ethyl, propyl, butyl, isopropyl and the like.
(b) Phenyl containing at least one nuclear substituent such as a halogen like chlorine, hydroxy, amino, nitro, trifluoromethyl and lower alkoxy.
(c) Aralkyl groups such as phenyl-lower alkyl groups including the benzyl, phenethyl, phenylisopropyl and phenylbutyl.
(d) Cycloalkyl groups such as the cyclopropyl cyclopentyl, and cycloheptyl groups.
(e) Heterocyclic groups such as pyridyl, pyridyl-lower alkyl, N-lower alkyl piperidyl, N-lower alkyl piperidyl-lower alkyl, pyrrolidyl, pyrrolidyl-lower alkyl, N-lower alkyl pyrrolidyl-lower alkyl, indolyl and 5-keto-2-pyrrolidyl.
(f) Hydroxy-lower alkyl groups such as the hydroxymethyl and hydroxyethyl groups.
(g) Cycloalkyl-lower alkyl groups such as the cyclopentylpropyl and cyclohexylmethyl groups.
(h) Groups in which

represents a dicylic glycolyl group including the benziloyl, phenylcyclohexyl glycolyl, phenylcyclopentyl glycolyl, 2-thienyl phenyl glycolyl and dicyclohexyl glycolyl groups.
(i) Amino-lower alkyl groups such as aminomethyl, β-aminoethyl, alpha-aminoethyl, 3-(methyl-mercapto)-1-aminopropyl, 4-methyl-1-aminobutyl, 3-hydroxy-1-aminopropyl, 3-methyl-3-hydroxy-1-aminopropyl.
(j) Omega-carboxy-(amino)-lower alkyl groups such as 2-carboxy-1-aminoethyl, 3-carboxy-1-aminopropyl, and 3-carboxy-3-amino-1-propyl.
(k) Carboxyalkyl groups such as the carboxyl-lower alkyl groups including the carboxyethyl group.

The most important compounds are those of the above formula in which $R_1$ is a heterocyclic group such as defined under (e) above and particularly those in which $R_1$ is a pyrrolidyl or piperidyl group.

The phenylcyclopropylamides are potent inhibitors of the enzyme monamine oxidase. Although phenylcyclopropyl amine is also a potent inhibitor of this enzyme, this compound causes a marked increase in blood pressure and heart rate, as well as an amphetamine-like stimulation of the central nervous system. 1-Methyl-2-phenylcyclopropylamine has pharmacological properties quite similar in kind to the compound without the 1-methyl group.

The novel phenylcyclopropylamides are practically devoid of undesirable side effects. Furthermore, the acute toxicities of the amides are significantly less than for the free amine. This invention thus provides potent inhibitors of the enzyme monoamine oxidase which are devoid of the concomitant side effects of the free amine and have much more selective action in the treatment of the depressed mental state, angina pectoris and arthritis. Clinical improvement in the treatment of the depressed mental state is charcterized by elevation of mood, diminution of confusion, reduction in depressive attitudes and notable alertness.

The phenylcyclopropylamides, other than those from amino acids, can be produced by reacting a phenylcyclopropylamine as the racemic D,L-mixture with an appropriate acyl halide in an inert liquid reaction medium such as benzene, xylene, n-heptane and toluene. Approximately equimolar amounts of reactants can be employed. The reaction proceeds at room temperature although elevated temperatures such as the reflux temperature can be used to increase the reaction rate. An equivalent amount of a strong organic base such as triethylamine can be included in the reaction mixture to bind the hydrohalic acid released by the reaction. After the reaction is completed, which generally takes no more than 1 to 3 hours, the reaction mixture can be treated according to conventional manipulative techniques to isolate the desired product.

2-Phenylcyclopropylamine is disclosed in J. Am. Chem. Soc. 70, 2198 (1948). It is available in the cis or trans forms. 1 - lower alkyl-2-phenylcyclopropylamines can also be produced as disclosed in the prior art. Thus, in J. Med. & Pharm. Chem. 4, No. 3, 571 (1961), there is disclosed the preparation of 1-methyl-2-phenylcyclopropylamine. Other compounds of this class in which the methyl group is replaced by ethyl, propyl or another lower alkyl can be produced in a similar manner.

Some of the acyl halides of carboxylic acids which can be used in this reaction are formyl chloride, acetyl chloride, propionyl chloride, butyryl chloride, isopropionyl bromide, caproyl chloride, capryl bromide, lauroyl chloride, palmityl chloride, benzoyl chloride, o-chlorobenzoyl bromide, 3,4-methylenedioxybenzoyl chloride, p-methoxybenzoyl chloride, phenylacetyl chloride, beta-phenylpropionyl chloride, gamma-phenylbutyryl chloride, 3,4-methylenedioxyphenylacetyl chloride, cyclopentane carboxyl chloride, cyclohexane carboxyl chloride, cyclopentylacetyl chloride, beta-cyclohexyl propionyl chloride, benziloyl chloride, and phenylcyclohexyl glycolyl chloride.

Some of the phenycyclopropylamides formed in this way are:

N-(2-phenylcyclopropyl)-formamide
N-(2-phenylcyclopropyl)-acetamide
N-(2-phenylcyclopropyl)-propionamide
N-(2-phenylcyclopropyl)-butyramide
N-(1-methyl-2-phenylcyclopropyl)-acetamide
N-(2-phenylcyclopropyl)-p-chloro-benzamide
N-(2-phenylcyclopropyl)-phenylacetamide
N-(2-phenylcyclopropyl)-phenylpropionamide
N-(2-phenylcyclopropyl)-cyclopentyl carboxamide
N-(2-phenylcyclopropyl)-cyclohexyl carboxamide N-(2-phenylcyclopropyl)-cyclopentylacetamide
N-(1-methyl-2-phenylcyclopropyl)-cyclopentylacetamide
N-(2-phenylcyclopropyl)-beta-cyclohexylpropionamide
N-(2-phenylcyclopropyl)-benzilamide
N-(2-phenylcycloprpoyl)-glycolamide
N-(2-phenylcyclopropyl)-beta-hydroxypropionamide
N-(2-phenylcyclopropyl)-trimethylacetamide
N-(2-phenylcyclopropyl)-palmitamide The amides of phenylcyclopropylamine and amino-acids are advisably prepared by reacting phenylcyclopropylamine with the free amino acid to form the acid addition salt which is dehydrated in situ with dicyclohexylcarbodiimide. This reaction can be represented as follows:

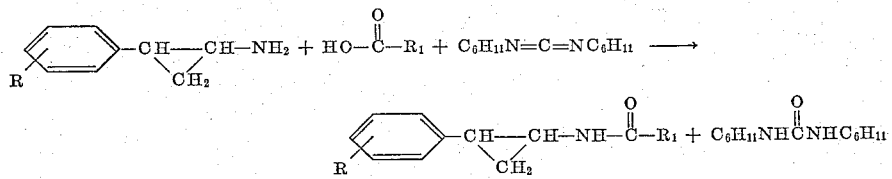

in which $R_1$ is an amino containing group as indicated previously, and R has the significance previously assigned.

A liquid reaction medium is advisably used which dissolves the reactants but from which 1,3-dicyclohexylurea, formed in the reaction, precipitates quantitatively. Methanol, ethanol, isopropanol, n-butanol, dioxane and tetrahydrofuran are typical solvents which can be used for the reaction medium. The reaction can be effected at room temperature or moderately elevated temperatures as up to 65° C. Higher temperatures are generally not needed. After the reaction is terminated, the 1,3-dicyclohexylurea is removed, as by filtration, and the desired amide isolated by evaporation of the mother liquor.

Representative of the amino acids which can be used in the process are glutamic acid, glycine, serine, 5-methyl-3-isoxazolecarboxylic acid, alanine, tryptophane, aspartic acid, p-chloronicotinic acid, isonicotinic acid, N-methyl nicotinic acid, methionine, lysine, proline, histidine, N-methyl-pyrrolidine carboxylic acid and 5-pyrrolidone-2-carboxylic acid (usually as the available L-form).

Typical of the phenylcyclopropyl amides which are produced from amino acids are:

N-(2-phenylcyclopropyl)-5-pyrrolidone-2-carboxamide
N-(1-methyl-2-phenylcyclopropyl)-5-pyrrolidone-2-carboxamide
N-(2-phenylcyclopropyl)-glutamide
N-(2-phenylcyclopropyl)-glycinamide
N-(2-phenylcyclopropyl)-serinamide
N-(2-phenylcyclopropyl)-5-methyl-3-isoxazolecarboxamide
N-(1-methyl-2-phenylcyclopropyl)-isonicotinamide
N-(2-phenylcyclopropyl)-alanineamide
N-(2-phenylcyclopropyl)-tryptophanamide
N-(2-phenylcyclopropyl)-aspartamide
N-(2-phenylcyclopropyl)-isonicotinamide
N-(2-phenylcyclopropyl)-lysineamide
N-(2-phenylcyclopropyl)-methionineamide
N-(2-phenylcyclopropyl)-pyrrolidine-2-carboxamide
N-(2-phenylcyclopropyl)-nicotinamide Instead of employing racemic 2-phenylcyclopropyl-amine in the described processes this amine can first be resolved and the separated D-2-phenylcyclopropylamine or L-2 phenylcyclopropylamine, or mixtures thereof, used to react with the acid or acid halide. The D-form of the amine is more active, so it would advisably be used.

One convenient way to resolve D,L-2-phenylcyclopropylamine is to disperse the amine in the form of an acid addition salt of 5-pyrrolidone-2-carboxylic acid (advisably as the L-form) in ethanol (advisably containing about 5% methanol) and separating the precipitated 5-pyrrolidone-2-carboxylic acid addition salt of L-2-phenylcyclopropylamine from the mixture leaving the 5-pyrrolidone-2-carboxylic acid addition salt of D-2-phenylcyclopropylamine in solution. By treating the filtered 5-pyrrolidone-2-carboxylic acid addition salt of L-2-phenylcyclopropylamine with a base, such as aqueous sodium hydroxide, there is obtained L-2-phenylcyclopropylamine substantially free of D-2-phenylcyclopropylamine. Similarly, by precipitating the 5-pyrrolidone-2-carboxylic acid addition salt of D-2-phenylcyclopropylamine from solution in the ethanol such as by the addition of ether, or partial or total evaporation, recovering the salt and treating it with a base such as aqueous sodium hydroxide, there is liberated D-2-phenylcyclopropylamine substantially free of L-2-phenylcyclopropylamine.

D-2-phenylcyclopropylamine can be reacted with L-5-pyrrolidone-2-carboxylic acid to form D-N-(2-phenylcyclopropyl)-L-5-pyrrolidone-2-carboxamide, and L-2-phenylcyclopropylamine can be reacted with L-5-pyrrolidone-2-carboxylic acid to form L-N-(2-phenylcyclopropyl)-L-5-pyrrolidone-2-carboxamide. These products can be mixed together in various amounts from 0% to 50% of one and 50% to 100% of the other to give useful mixtures.

Obviously, if trans-2-phenylcyclopropylamine is resolved, the optical isomers will be the trans-isomers.

One of the most active compounds is 2-phenylcyclopropyl-5-pyrrolidone-2-carboxamide which can be used as D,L-N-(2-phenylcyclopropyl)-5 - pyrrolidone - 2 - carboxamide. However, the optically active D-N-(2-phenylcyclopropyl)-L-5-pyrrolidone-2-carboxamide has been found more active than the racemic mixture, and to have fewer side effects, as a monoamine oxidase inhibitor and antidepressant.

The novel amides of this invention are advisably formulated into suitable pharmaceutical forms. The preferred route of administration is oral and for this method unit dosage forms such as tablets and capsules are ordinarily recommended. Unit-dosages can contain any desired amount of the amide although generally 1 to 50 mgm. is suitable. Such dosages can be administered one or more at a time once a day or at various intervals throughout the day. Total daily administration of about 1 to 100 mgm. of one or more of the active amides provided by this invention per day is generally suitable.

Any suitable pharmaceutical carriers can be used with one or more of the active compounds to achieve a more practical volume for a unit dosage. Sugar, starch and talc are suitable solid carriers which can be used in forming tablets and capsules. However, liquid carriers including water can be used as desired.

One typical tablet can have the following composition:

| | Mg. |
|---|---|
| (1) N-trans-2-phenylcyclopropyl-5-pyrrolidone-2-carboxamide | 5 |
| (2) Starch, U.S.P. | 57 |
| (3) Lactose, U.S.P. | 73 |
| (4) Talc, U.S.P. | 9 |
| (5) Stearic acid | 6 |

The following examples illustrate the preparation of the compounds of this invention:

*Example 1.—N-trans-2-phenylcyclopropyl-L-5-pyrrolidone-2-carboxamide*

To a mixture containing 13.3 g. (0.10 mole) of trans-2-phenylcyclopropylamine and 12.9 g. (0.10 mole) of L-5-pyrrolidone-2-carboxylic acid dissolved in 150 cc. of ethanol were added 21.6 g. (0.105 mole) of dicyclohexylcarbodiimide with cooling. The reaction mixture was allowed to stand at room temperature for 24 hours. The precipitate of dicyclohexylurea was removed by filtration, the filtrate concentrated to dryness in vacuo and the oily residue taken up in acetonitrile. The acetonitrile solution was clarified by filtration, the filtrate concentrated again to dryness and the product isolated from the residue, yield 20 g. (82%) of an oil, which solidified on standing to a waxy mass.

Analysis.—Calcd. for $C_{14}H_{15}N_2O_2$: N, 11.53. Found: N, 11.45.

*Example 2.—Resolution of D,L-trans-2-phenylcyclopropylamine as the L-5-pyrrolidone-2-carboxylic acid salts*

To a solution of 5.2 g. (0.4 mole) of L-5-pyrrolidone-2-carboxylic acid in 80 cc. of ethanol with 5% methanol at room temperature was added a solution of 5.3 g. (0.4 mole) of trans-2-phenylcyclopropylamine in 20 cc. of ethanol with 5% methanol. The solution was cooled in an ice bath and when crystallization was complete, the salt was collected by filtration, washed with anhydrous ether and dried, yielding 4.6 g. of salt A, M.P. 152–154° C. Recrystallization from acetonitrile afforded 3.8 g. of the pure salt, M.P. 150–151° C. $[\alpha]_D^{25}$—59.67° (water).

Liberation of the base from salt A with aqueous sodium hydroxide gave relatively pure L-trans-2-phenyl-cyclopropylamine $[\alpha]_D^{25}$—117.5° (dioxane).

The filtrate remaining after separation of salt A was diluted with ether which caused salt B to crystallize affording 4.2 g., M.P. 118–121° C. Recrystallization from acetonitrile left 3.9 g. of salt, M.P. 119–120° C. $[\alpha]_D^{25}$+23.27° (water).

Liberation of the base from salt B with aqueous sodium hydroxide gave highly enriched D-trans-2-phenylcyclopropylamine, $[\alpha]_D^{25}$+81.4° (dioxane).

*Example 3.—D-N-(trans-2-phenylcyclopropyl)-L-5-pyrrolidone-2-carboxamide*

To a solution of 5.4 g. (0.042 mole) of L-5-pyrrolidone-2-carboxylic acid and 5.6 g. (0.042 mole) of D-trans-2-phenylcyclopropylamine in 35 cc. of ethanol with 5% methanol was added a solution of 9.1 g. (0.044 mole) of dicyclohexylcarbodiimide in 15 cc. of ethanol with 5% methanol. After stirring overnight at room temperature, the N,N'-dicyclohexylurea (9.4 g.) was collected by filtration and was washed with acetonitrile. The filtrate was concentrated under reduced pressure and the residue (12.9 g.) was dissolved in 15 cc. of warm acetonitrile. When crystallization was complete, the solid was collected by filtration and dried, yielding 7.8 g. of product, M.P. 138–141° C. Recrystallization from hot water left 3.6 g. of amide, M.P. 144–147° C. $[\alpha]_D^{25}$+104.28° (dimethylformamide).

Analysis.—Calcd. for $C_{14}H_{16}N_2O_2$: N, 11.47. Found N, 11.32.

*Example 4.—L-N-(trans-2-phenylcyclopropyl)-L-5-pyrrolidone-2-carboxamide*

A mixture of 7.0 g. (0.054 mole) of L-5-pyrrolidone-2-carboxylic acid and 7.2 g. of L-trans-2-phenylcyclopropylamine (0.054 mole) in 55 cc. of ethanol with 5% methanol was treated with 11.5 g. (0.057 mole) of dicyclohexylcarbodiimide in 30 cc. of ethanol with 5% methanol. After standing overnight at room temperature, the mixture was cooled briefly in an ice bath and the precipitated urea was collected by filtration, washed with acetonitrile and dried, yielding 11.2 g. (92%). An additional 0.8 g. of urea was obtained from the filtrate by removing the solvent under reduced pressure and dissolving the residue in 30 cc. of warm acetonitrile. On cooling, the urea separated. The filtrate was concentrated under reduced pressure and the residue was dissolved in 35 cc. of hot isopropyl alcohol. The desired amide crystallized on cooling affording a solid, M.P. 129–132° C. Recrystallization from isopropyl alcohol left 4.0 g. of pure amide, M.P. 136–137° C. $[\alpha]_D^{25}$—110.56° (dimethylformamide).

Analysis.—Calcd. for $C_{14}H_{16}N_2O_2$: N, 11.47. Found: N, 11.24.

*Example 5.—N-(trans-2-phenylcyclopropyl)-p-chlorophenoxyacetamide*

A 500 cc. 3 neck round bottom flask was charged with 13.3 g. (0.1 mole) of trans-phenylcyclopropylamine, 13.8 g. (0.1 mole) of anhydrous potassium carbonate and 200 cc. of dry benzene. In approximately 45 minutes, at room temperature, with stirring was added 20.5 g. (0.1 mole) of p-chlorophenoxyacetyl chloride in 100 cc. of dry benzene. A voluminous white precipitate formed. After stirring at room temperature for 1 hour, the reaction mixture was refluxed for 3 hours. The precipitate was filtered off while hot, with a second precipitate falling out in the filtrate upon cooling. The second precipitate was filtered off while cooling and proven to be trans phenylcyclopropylamine hydrochloride. The filtrate was washed with 5% aqueous sodium hydroxide, water, 5% aqueous HCl and water until neutral. The benzene was removed by distillation. The residue of 32.5 g. was picked up in 200 cc. of n-hexane. With scratching and cooling, a precipitate formed. Yield: 16 g. (53%), M.P. 83–85° C.

Analysis.—Calcd. for $C_{17}H_{16}ClNO$: N, 4.64; Cl, 11.77. Found: N, 4.66; Cl, 12.16.

*Example 6.—N-(trans-2-phenylcyclopropyl)-2-piperidino acetamide*

A solution of 5.8 g. (0.068 mole) of 98% piperidine was added dropwise in 10 minutes at room temperature to 6.4 g. (0.034 mole) of N-(2-phenylcyclopropyl)-chloroacetamide in 50 cc. of benzene. The mixture was refluxed for 3 hours. The precipitate that formed was filtered off (3.5 g.) and the solvent removed from the filtrate. An oily residue of 9 g. (100%) resulted.

Analysis.—Calcd. for $C_{16}H_{22}N_2O$: N, 10.85. Found: N, 10.72.

*Example 7.—N-(trans-2-phenylcyclopropyl)-2-chloroacetamide*

6.65 g. (0.05 mole) of trans-phenylcyclopropylamine, 50 cc. of anhydrous benzene and 6.9 g. (0.05 mole) of anhydrous potassium carbonate were placed in a 250 cc. 3 neck round bottom flask. The temperature of the mixture was brought to 0–10° C. with the aid of an ice bath. 5.65 g. (0.05 mole) of chloroacetyl chloride in 25 cc. of anhydrous benzene was added dropwise in 1 hour to the mixture with the temperature being held below 10° C. The mixture was stirred at 0–10° C. for 4 hours and then 1 hour at room temperature. The precipitate was filtered, washed slowly with 50 cc. of ether and then 50 cc. of benzene. The filtrate and washings were combined and washed successively with 5% $NaHCO_3$, 5% HCl (aqueous), and water and the washings discarded. The filtrate was concentrated to dryness on a steam bath leaving a solid residue (9 g.). The residue was recrystallized in 100 cc. of warm ether and 50 cc. of n-hexane. Yield: 7.6 g. (0.3 g. recovered from mother liquor) 72%, M.P. 73–74° C.

Analysis.—Calcd. for $C_{11}H_{12}NOCl$: N, 6.66; Cl, 16.90. Found: N, 6.72; Cl, 16.86.

*Example 8.—N-(trans-2-phenylcyclopropyl)acrylamide*

To a cold solution of 9.05 g. (0.1 mole) of acryloylchloride in 100 cc. of benzene containing a trace of hydroquinone was added in 1 hour dropwise with stirring at 5–10° C. a solution of 13.3 g. (0.1 mole) of trans-phenylcyclopropylamine and 10.1 g. (0.1 mole) of triethylamine in 100 cc. of dry benzene. After stirring overnight at room temperature, the salt was filtered off. The filtrate was washed with water and dried over sodium sulfate. The solvent was removed, leaving 18.1 g. of residue. This residue was dissolved in 65 cc. of hot benzene, filtered and to the filtrate was added 65 cc. of heptane. The compound which separated was filtered off, rinsed with heptane and dried. Yield 15.5 g. (83%), M.P. 77° C.

*Analysis.*—Calcd. for $C_{12}H_{13}NO$: C, 76.97; H, 7.00; N, 7.48. Found: C, 76.40; H, 6.98; N, 7.52.

Example 9.—N-isonicotinoyl-trans-phenylcyclopropylamine

To a solution of 25 g. (0.2 mole) of isonicotinic acid in 500 cc. of dichloromethane, cooled in ice water, was added 20.3 g. (0.2 mole) of triethylamine. To the clear solution was added with stirring at 0–5° C. dropwise, 23.8 g. (0.22 mole) of ethylchloroformate. After stirring at 0° C. for 30 minutes, a solution of 27 g. (0.2 mole) trans-phenylcyclopropylamine in 50 cc. dichloromethane was added dropwise at 0–5° C. The icebath was removed and the solution was stirred for two hours at room temperature. The solution was washed with bicarbonate solution and water, dried and taken to dryness to give 40.6 g. residue. This was recrystallized from 50 cc. of hot benzene to give 18.9 g. product, M.P. 125° C. After several recrystallizations from a four to five-fold amount of ethanol we obtained 4.2 g. of the amide, M.P. 142° C.

*Analysis.*—Calcd. for $C_{15}H_{14}N_2O$: C, 75.61; H, 5.92; N, 11.76. Found: C, 75.38; H, 5.96; N, 11.50.

Example 10.—N-(4-hydroxybutyryl)-trans-phenylcyclopropylamine

A mixture of 13.3 g. (0.1 mole) trans-phenylcyclopropylamine and 8.6 g. (0.1 mole) γ-butyrolactone was heated on a steam bath for 22 hours. The cooled mixture crystallized. The solids were triturated with 50 percent ether-n-hexane and filtered. Yield 18.8 g., M.P. 74–76° C. All solids were dissolved in 100 ml. warm tetrahydrofuran, filtered, diluted with n-hexane to cloud point and refrigerated. Solids crystallized, collected by filtration and dried. M.P. 83–85° C. 123 g. (56 percent).

*Analysis.*—Calcd. for $C_{13}H_{17}NO_2$: C, 71.20; H, 7.81; N, 6.39. Found: C, 69.35; H, 8.27; N, 6.45.

All material recrystallized from 100 ml. hot benzene, cooled, filtered and dried. M.P. 83–85° C. 116 g. (53 percent).

*Analysis.*—Found: C, 70.27; H, 7.60; N, 6.37.

All solids again recrystallized from 100 ml. hot benzene, filtered, cooled, collected by filtration and dried.

*Analysis.*—Found: C, 71.50; H, 7.81; N, 6.36.

Example 11.—Trans-N-phenylcyclopropyl-2-(N-benzyl-N-propargyl)-aminoacetamide A solution of 21 g. (0.1 mole) of trans N-phenylcyclopropyl-2-chloroacetamide in 150 cc. of toluene was added dropwise with stirring to a solution of 29 g. (0.2 mole) of N-benzyl-N-propargylamine in 150 cc. toluene, and the solution was refluxed for 24 hours. After cooling, the salt was filtered off and the filtrate was taken to dryness. The 46 g. residue was dissolved in 500 cc. ether, washed twice with water, extracted with 10 percent aqueous HCl, the acid layer extracted with ether (discarded) and made alkaline with potassium hydroxide. The resulting oil was extracted with ether, dried over potassium carbonate, filtered and taken to dryness to give 12.6 g (42 percent) of a dark oil.

*Analysis.*—Calcd. for $C_{21}H_{22}N_2O$: C, 79.21; H, 6.96; N, 8.80. Found: C, 79.84; H, 7.08; N, 9.01.

Example 12.—N-(3,4,5-trimethoxybenzoyl-trans-phenylcyclopropylamine

A solution of 18.5 g. (0.08 mole) of 3,4,5-trimethoxybenzoyl chloride in 300 cc. ether and 50 cc. benzene was added dropwise to a stirred cooled solution of 10.65 g. (0.08 mole) trans-phenylcyclopropylamine, 8.1 g. (0.08 mole) triethylamine and 200 cc. ether. The resulting heavy white precipitate was stirred overnight at room temperature. The precipitate was filtered off and slurried twice in 500 cc. water. The precipitate of the final filtration was washed frequently with water and then dried. Yield 25.5 g., M.P. 178–180° C. Recrystallization was accomplished from about twenty fold amounts of boiling methanol. Final yield 18 g. (68 percent), M.P. 192–194° C.

*Analysis.*—Calcd. for $C_{19}H_{21}O_4N$: N, 4.25; C, 69.70; H, 6.46. Found: N, 4.24; C, 69.86; H, 6.72.

Example 13.—N-trans-2-phenylcyclopropyl-4-(N-piperidyl)-butyramide

To a solution of 8.5 g. (0.1 mole) of piperidine in 200 cc. of benzene was added dropwise a solution of 11.9 g. (0.05 mole) of N-trans-2-phenylcyclopropyl-4-chlorobutyramide in 100 cc. of benzene. After 24 hours of reflux the salt was filtered off and the benzene solution was extracted with dilute aqueous HCl. The aqueous layer was made alkaline with KOH and was extracted with ether. The ethereal solution was dried over potassium carbonate, filtered and the ether was removed by distillation. The residue was fractionated, yielding 9.8 g. (68.5 percent) of base, B.P. 190° C./0.06 mm. $N_D^{20}$ 1.5447.

*Analysis.*—Calcd. for $C_{18}H_{26}N_2O$: N, 9.78. Found: N, 9.67.

Example 14.—N-trans-2-phenylcyclopropyl-4-chlorobutyramide

To a well stirred mixture of 20.7 g. (0.15 mole) of anhydrous potassium carbonate, 21.15 g. (0.15 mole) of 4-chlorobutyroylchloride and 300 cc. of dry benzene was added in 1 hour at 10° C. a solution of 20.0 g. (0.15 mole) of trans-phenylcyclopropylamine in 100 cc. of benzene. After stirring for 4 hours at room temperature, 150 cc. of water was added and the benzene layer was washed with water, cold dilute HCl and water until neutral. After drying over anhydrous $K_2CO_3$, the benzene was removed by distillation leaving 34 g. of a solid residue. This residue was dissolved in 350 cc. of ether, filtered and the compound was reprecipitated by addition of 200 cc. of heptane. 25.5 g. (71.5 percent) of compound, M.P. 74° C. was obtained.

*Analysis.*—Calcd. for $C_{13}H_{16}ClNO$: Cl, 14.92; N, 5.89. Found: Cl, 15.03; N, 5.96.

Example 15.—L-phenylalanyl-d-trans-phenylcyclopropylamine

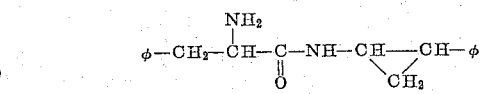

To a cooled mixture of 29.5 g. (0.1 mole) of carbobenzoxy-L-phenylalanine and 250 cc. of dichloromethane was added 10.1 g. (0.1 mole) of triethylamine. To the stirred solution was added dropwise at 0–5° C. a solution of 11.9 g. (0.11 mole) of ethylchloroformate in 50 cc. of dichloromethane. The solution was kept at −5° C. for 30 minutes, after which a solution of 13.3 g. (0.1 mole) of d-trans-phenylcyclopropylamine in 50 cc. of dichloromethane was added dropwise at −5° C. The mixture was stirred for 2 hours at room temperature, washed with water, bicarbonate solution, dilute HCl, and water, dried and concentrated to give 38.2 g. of carbobenzoxy-L-phenylalanyl-d-trans-phenylcyclopropylamine. This crude amide was recrystallized from 275 cc. of hot isopropanol to give 25.5 g. of product, M.P. 150–152° C. Repeated recrystallization from isopropanol increased the M.P. to 160–163° C.

*Analysis.*—Calcd. for $C_{26}H_{26}N_2O_3$: N, 6.76. Found: N, 6.77.

A solution of 8.29 g. of carbobenzoxy-1-phenylalanyl-d-trans-phenylcyclopropylamine in 250 cc. of ethanol was reductively decarbobenzoxylated in the presence of 1 g. of 10% palladium on carbon catalyst. The catalyst was removed by filtration, the filtrate was concentrated and the residue was recrystallized from heptane to give the crystalline amide, M.P. 91° C.

*Analysis.*—Calcd. for $C_{18}H_{20}N_2$: N (non aqueous), 4.99; N (total) 10.00. Found: N (non aqueous) 4.87; N (total), 9.98.

*Example 16.—N-(N-methyl)pipecoloyl-trans-phenyl-cyclopropylamine*

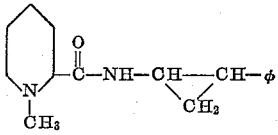

To a cooled slurry of 14.3 g. (0.1 mole) of N-methylpipecolic acid in 250 cc. of dichloromethane was added at 20° C., 10.15 g. (0.1 mole) of triethylamine. To the mixture was added at 5–15° C., dropwise, 11.9 g. (0.11 mole) of ethylchloroformate. After the mixture had stirred for 0.75 hours at 5° C., a solution of 13.3 g. (0.1 mole) of trans-phenylcyclopropylamine in 25 cc. of dichloromethane was added in 10 minutes. The resulting clear solution was kept at room temperature for 2 hours, washed with cold aqueous bicarbonate solution and with water, and finally extracted with dilute hydrochloric acid. The aqueous acid extracts were washed with benzene (discarded) and the solution was made alkaline with potassium hydroxide. The product separated and was extracted into benzene, dried, and evaporated to give 12 g. of oily product, which solidified on standing. The infrared spectrum was consistent with the assigned structure.

*Analysis.*—Calcd. for $C_{16}H_{22}N_2O$: N, 10.85. Found: N, 10.82.

Various changes and modifications of the invention can be made and, to the extent that such variations incorporate the spirit of this invention, they are intended to be included within the scope of the appended claims.

What is claimed is:
1. 2-phenylcyclopropyl-5-pyrrolidone-2-carboxamide.
2. D-N-(trans-2-phenylcyclopropyl)-L-5 - pyrrolidone-2-carboxamide.
3. The acid addition salt of 5-pyrrolidone-2-carboxylic acid with 2-phenylcyclopropylamine.
4. A phenylcyclopropyl amide of the formula

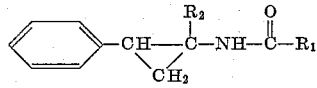

wherein $R_1$ is a member of the group consisting of pyridyl and 5-keto-2-pyrrolidyl and $R_2$ is a member of the group consisting of hydrogen and lower alkyl.

References Cited by the Examiner

UNITED STATES PATENTS

| | | | |
|---|---|---|---|
| 2,565,503 | 8/51 | Kaplan | 260—239.1 |
| 2,934,542 | 4/60 | Burger | 260—340.5 |
| 2,951,849 | 9/60 | Gutmann et al. | 260—326.3 |
| 2,997,422 | 8/61 | Tedeschi | 167—65 |
| 3,011,945 | 12/61 | Bolling et al. | 167—65 |
| 3,068,283 | 12/62 | Kaiser et al. | 260—326.3 |

OTHER REFERENCES

Fieser and Fieser, "Organic Chemistry," 3rd Edition, page 270 (1956).

IRVING MARCUS, *Primary Examiner.*

JOHN D. RANDOLPH, NICHOLAS S. RIZZO, WALTER A. MODANCE, *Examiners.*

UNITED STATES PATENT OFFICE
CERTIFICATE OF CORRECTION

Patent No. 3,192,229                              June 29, 1965

John H. Biel

It is hereby certified that error appears in the above numbered patent requiring correction and that the said Letters Patent should read as corrected below.

Column 1, lines 19 to 23, for that portion of the formula reading

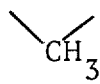          read          

line 33, for "substittuent" read -- substituent --; column 2, line 21, for "charcterized" read -- characterized --; column 3, line 5, for "2-phenylcycloprpoyl" read -- 2-phenylcyclopropyl --; column 7, line 38, for "123" read -- 12.3 --; line 66, for "(3,4,5-trimethoxybenzoyl", in italics, read -- (3,4,5-trimethoxybenzoyl) --, in italics Signed and sealed this 30th day of November 1965.

(SEAL)
Attest:

ERNEST W. SWIDER                          EDWARD J. BRENNER
Attesting Officer                        Commissioner of Patents